(12) United States Patent  
Gant (10) Patent No.: US 9,326,499 B1  
(45) Date of Patent: May 3, 2016

(54) ADJUSTABLE TONE GAME CALL

(71) Applicant: Primos, Inc., Flora, MS (US)

(72) Inventor: Jimmy D. Gant, Lakeview, AR (US)

(73) Assignee: PRIMOS, INC., Flora, MS (US)

( * ) Notice: Subject to any disclaimer, the term of this patent is extended or adjusted under 35 U.S.C. 154(b) by 20 days.

(21) Appl. No.: 13/711,939

(22) Filed: Dec. 12, 2012

Related U.S. Application Data (60) Provisional application No. 61/630,539, filed on Dec. 14, 2011.

(51) Int. Cl.
*A01M 31/00* (2006.01)

(52) U.S. Cl.
CPC .................................. *A01M 31/004* (2013.01)

(58) Field of Classification Search
CPC ....... A01M 31/004; A63H 5/00; G10D 9/005; G10D 9/043; G10D 9/023
USPC .................................................. 446/207–209
See application file for complete search history.

(56) References Cited

U.S. PATENT DOCUMENTS

| | | | |
|---|---|---|---|
| 333,094 A | 12/1885 | Fuller | |
| 726,277 A | 4/1903 | Fuller | |
| 2,460,716 A | 2/1949 | Shurley | |
| 2,544,370 A | 3/1951 | Walther | |
| 2,598,268 A | 5/1952 | Kendrick | |
| 2,608,796 A * | 9/1952 | Bicocchi | 446/208 |
| 2,729,025 A | 1/1956 | Bones | |
| 2,755,696 A * | 7/1956 | Legler | A63H 5/00 446/208 |
| 3,029,544 A | 4/1962 | Mobley | |
| 4,940,451 A | 7/1990 | Leady | |
| 5,249,499 A * | 10/1993 | Goldstein et al. | 84/386 |
| 5,643,039 A * | 7/1997 | McIntyre | A63H 5/00 446/208 |
| 5,885,126 A | 3/1999 | Carlson | |
| 5,975,978 A | 11/1999 | Hall | |
| 6,053,794 A * | 4/2000 | Weiser | A01M 31/004 446/207 |
| 6,106,357 A | 8/2000 | Weiser | |
| 6,234,860 B1 | 5/2001 | Cook | |
| 6,435,933 B1 * | 8/2002 | Browne | 446/207 |
| 6,527,614 B1 * | 3/2003 | Primos | 446/207 |
| 6,575,804 B1 | 6/2003 | Primos | |
| 6,648,716 B2 * | 11/2003 | Bean | A01M 31/004 446/193 |
| 6,709,309 B1 * | 3/2004 | Bishop et al. | 446/213 |
| 7,070,473 B1 | 7/2006 | Cassette | |
| 7,083,492 B1 | 8/2006 | Morocco | |
| 2006/0258258 A1 * | 11/2006 | Koch | 446/208 |

* cited by examiner

*Primary Examiner* — Michael Dennis  
*Assistant Examiner* — Urszula M Cegielnik  
(74) *Attorney, Agent, or Firm* — Holland & Hart

(57) ABSTRACT

A tubular, adjustable, reed-type game call has axially aligned, adjustable sections. A tubular horn is threadably interconnected with a tubular handle comprising a mouthpiece and an intermediate coupling with an internal sounding chamber. The horn is threadably mated to internal coupling threads, and relative twisting of the horn relative to the mouthpiece causes axial lengthening or shortening of the game call, as the horn is displaced relative to the coupling. A cylindrical anchor supports an elongated reed and a parallel, elongated sounding board. A contactor pressures the reed at a point that is varied when the parts are twisted together or apart, to shorten or lengthen the effective reed length, producing different user selectable sounds. A lock washer is positioned proximate the contactor for securing it.

18 Claims, 7 Drawing Sheets

ADJUSTABLE TONE GAME CALL

CROSS-REFERENCE TO RELATED APPLICATION

This application is based upon a prior U.S. Provisional Patent Application entitled DUAL REED ADJUSTABLE DEER CALL, Ser. No. 61/630,539, Filed Dec. 14, 2011, by inventor Jimmy D. Gant, and priority based upon said U.S. Provisional Patent Application is claimed.

BACKGROUND OF THE INVENTION

I. Field of the Invention

The present invention relates generally to game calls that produce sounds with internal reeds. More particularly, the present invention relates to adjustable game calls of the type employing reed-contacting apparatus for varying pitches and sounds produced by the call. Known prior art is classified in United States Patent Class 446, Subclasses 205-208.

II. Description of the Prior Art

It has long been recognized by those skilled in the hunting arts that various game animals can be attracted by hunters that emulate various natural sounds. For example, various duck calls are well known in the hunting arts. Some game calls, such as turkey calls, emulate the sounds of the game with wooden pieces that are frictionally, rubbed together properly to produce desired sounds. Other calls use vibrating reeds that generate sound when the user properly blows through a mouthpiece.

There are many mouth operated, game calls which include an internal reed that responds to air blown through the mouthpiece. In these game calls, a reed is held on a reed holder in the call, and the reed vibrates when the hunter blows air through the call proximate the reed. The tone or pitch of a typical game call can be adjusted by changing the dimensions or characteristics of the reed. For example, higher pitched sounds can be produced by changing to a reed of a smaller length.

Different animals require sounds varying in intensity, pitch and duration. A suitable game call must be able to produce sounds appropriate for the age, sex, or size of the target game. For example, sounds made by a deer fawn are different from those of a doe, and both are different from those made by a buck. An even greater range in pitch and tone is required to simulate sounds over a variety of animal genus and species. For example, a duck "quack" requires a relatively high pitch, while an elk call requires a much lower pitch.

Some prior art calls vary their sounds with movable, internal structures that variably contact and pressure the internal reed structure. Sound-modifying structures can be disposed within the call, such as a reed stop. Some known duck calls employ a moving slide that has one end inside the call to abut the reed. The slide can be moved back and forth to change the tone of the call. Mechanical pressure may be applied to a reed at selected, variable locations along the reed body to vary the effective vibrating length of the reed. Since the vibrating length of the reed determines the pitch of the sounds made, varying the reed contact point with an internal, mechanical contact produces various diverse sound variations.

For example, U.S. Pat. No. 4,940,451 issued Jul. 10, 1990 discloses an adjustable game call with a vibrating reed that is externally adjustable. Optional resonance tubes may be applied to the device to alter the volume of the resonance chamber to increase the variety of game sounds that may be produced.

U.S. Pat. No. 5,643,039 issued Jul. 1, 1997 shows a game call, specifically a deer grunt call, that includes an internal reed that generates sound in response to passing air. Tuning clips that can be removably installed into the mouthpiece limit the effective vibrating length of the reed, and thus vary the sound of the call. Each tuning clip can include a U-shaped portion that fits snugly over the rim of the mouthpiece, a shank or shaft that extends a predetermined distance axially into the mouthpiece, and a transverse, T-shaped reed stop at the distal end.

U.S. Pat. No. 6,053,794 issued Apr. 25, 2000 discloses an adjustable game call with a contact that deflects the free end of a vibrating reed to vary the tone produced.

U.S. Pat. No. 6,106,357 issued Aug. 22, 2000 shows an adjustable game call comprising a reed-contacting, sound adjustment structure for varying the sounds emitted from the game call. The game call has a housing rotatably engaged with a reed assembly, such that rotation of the reed assembly relative to the housing causes the sound adjustment structure to exert a varied force upon the internal, sound producing reed.

U.S. Pat. No. 7,070,473 issued Jul. 4, 2006 and U.S. Pat. No. 7,083,492 issued Aug. 1, 2006 show adjustable-tone deer calls with an internal reed. A metal slider disposed internally can be displaced longitudinally by the user to adjust the effective dimensions of the vibrating reed to vary the sound generated.

Notwithstanding the above, there still exists a need for a readily portable, reed-type game call that is readily adjustable by the hunter to produce a wide variety of tones, pitches and sounds. The device must be easily adjustable in the field, while preserving the basic reed configuration and tone. Externally displaceable elements are ideal as they are actuated quickly and simply. Such a call should be easily broken down and field stripped, for the possible change of internal components, such as reeds, and for periodic cleaning and maintenance.

SUMMARY OF THE INVENTION

This invention provides a tubular, adjustable, reed-type game call that has axially aligned, adjustable sections. A tubular horn is threadably interconnected with a tubular handle comprising a tubular mouthpiece. The horn portion is threadably mated to an intermediate tube connected to the mouthpiece, and relative twisting lengthens or shortens the call, as the horn portion threadably engages or unengages the handle interior.

A reed assembly comprises a cylindrical anchor supporting a reed and an opposing sounding board. An internal lock washer is penetrated by the reed and sounding board, and abuts an adjacent, coaxially positioned contactor touching the reed at variable locations when the parts are twisted together or apart. Thus, the effective reed length is shortened or lengthened in response to twisting, as the contact point is displaced, thereby producing a varying length of vibrating reed, and thus different sounds.

Thus a broad object of my invention is to provide a game call capable of simulating sounds from game animals varying widely in age, sex, and size.

Another object is to produce a game call that varies sound characteristics for a wide variety of targeted game animals.

It is also an object of the present invention to provide a reed type animal call of the character described that permits the user to adjust the pitch or tone of the call reliably and consistently.

A related object is to provide a variable pitch, deer grunt call which produces a low grunt, a high grunt and a bleat sound.

A still further object is to provide a call with an internal reed contact for varying reed pitch that operates simply by twisting the call's barrel.

A further object of the present invention is to provide a call with an adjustable reed structure that includes twin reeds.

Another basic object of the present invention is to provide a game call of the character described that emulates common sounds produced by male and female deer.

Another object of the present invention is to provide a call that allows the hunter to quickly and accurately switch between different sounds that are attractive to deer.

It is still another object to provide a deer call which requires only a twisting motion of the barrel to change the sounds produced.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
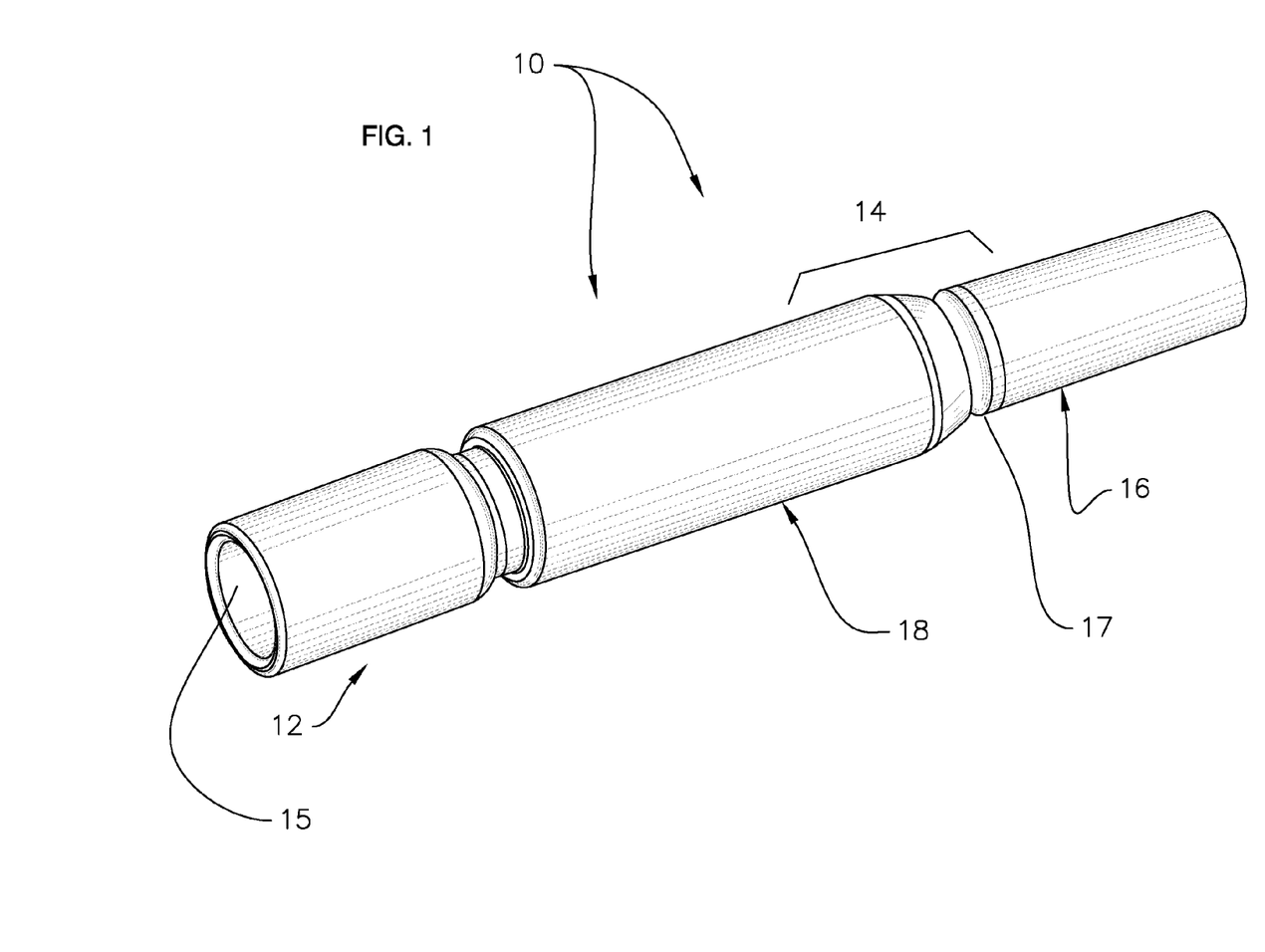
FIG. 1 is an isometric view of my new game call.
Figure 2:
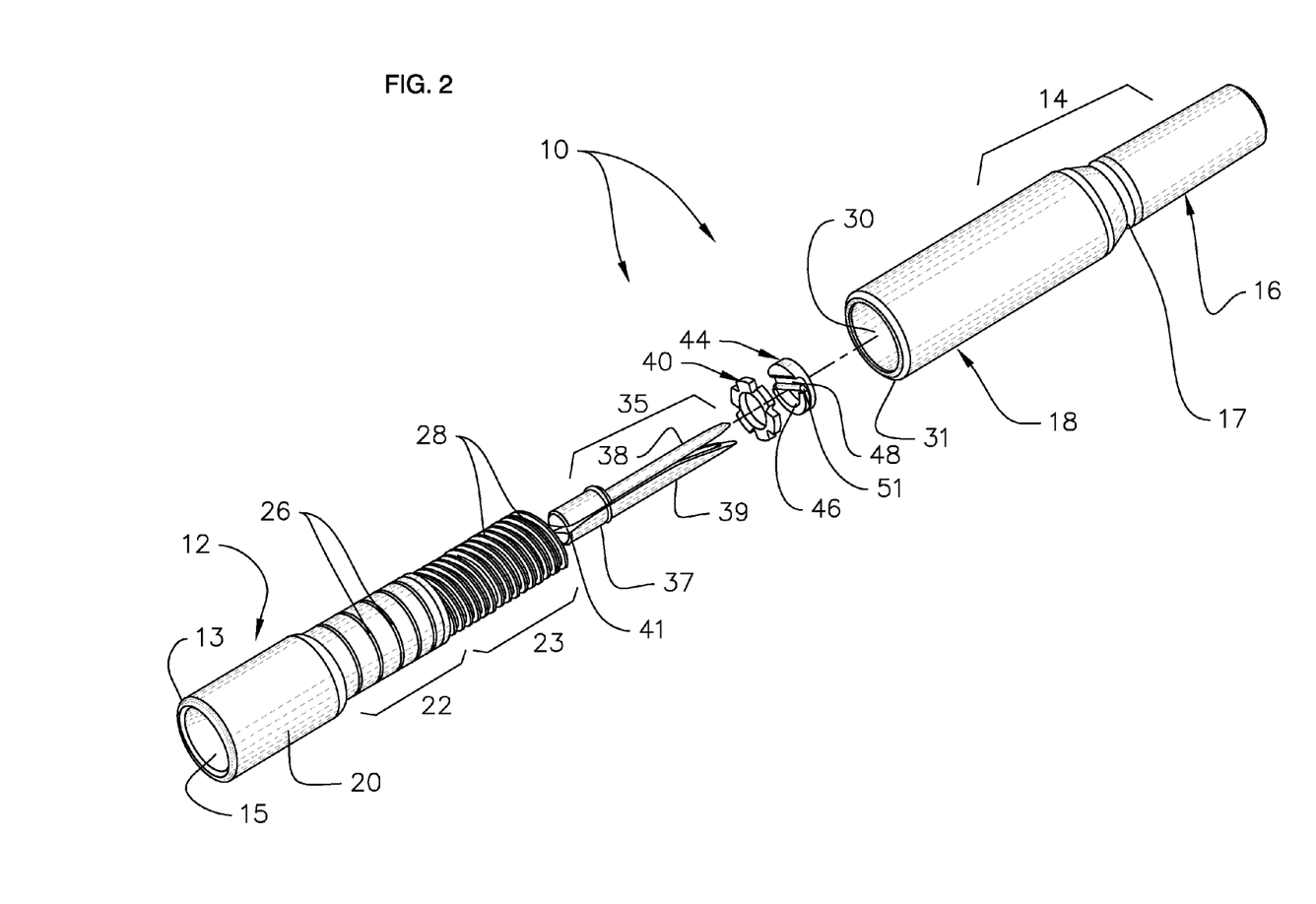
FIG. 2 is an enlarged, exploded, rear, isometric view.
Figure 3:
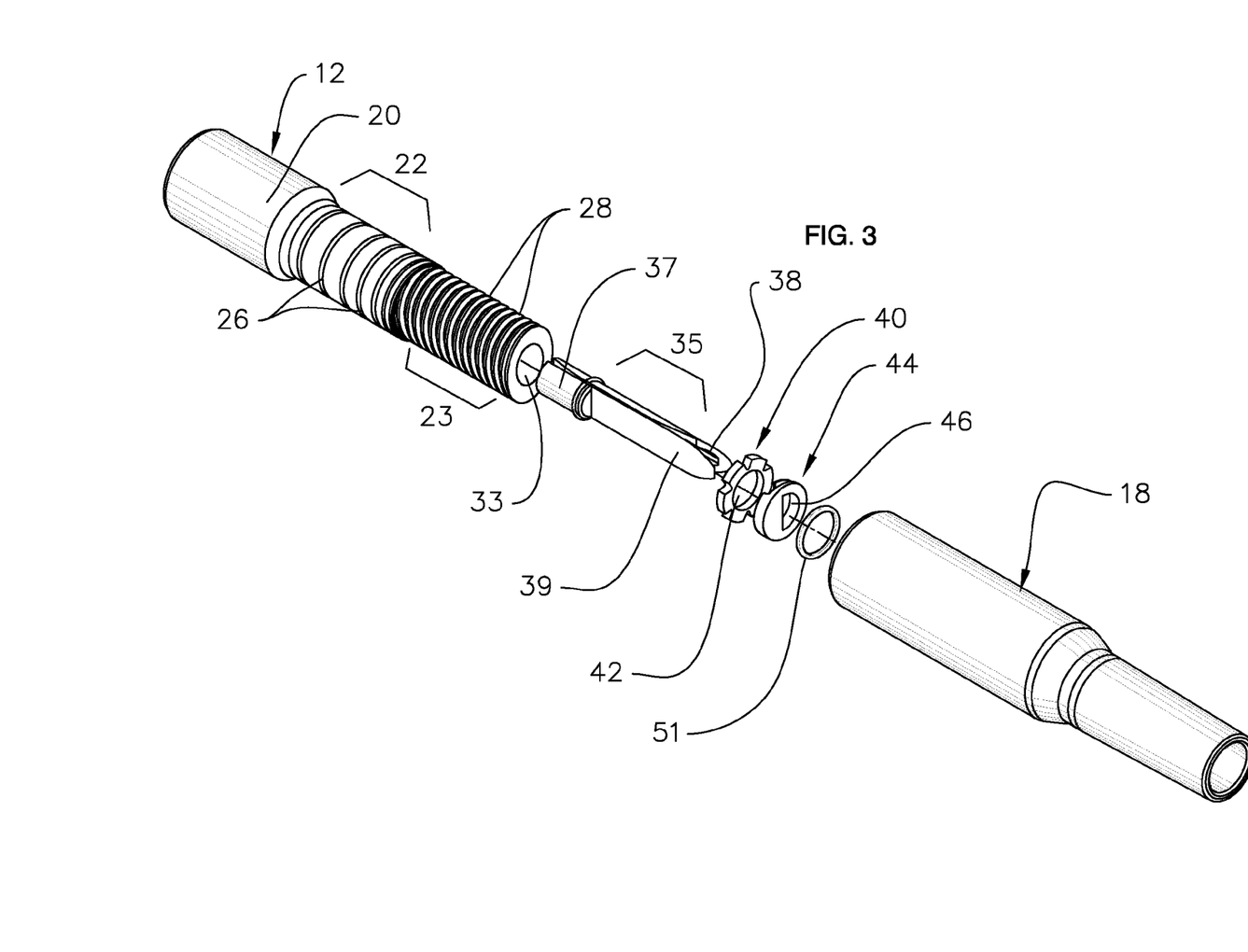
FIG. 3 is an enlarged, exploded, frontal, isometric view.

Turning initially now to FIGS. 1-3 of the appended drawings, an adjustable game call constructed in accordance with the best mode known to me has been generally designated by the reference numeral 10. The call 10 is elongated and substantially tubular, and it has a hollow interior. The call comprises a tubular horn 12 that is threadably interconnected with a forward handle 14; these parts may be twisted apart or together by the user. The handle 14 comprises a tubular mouthpiece 16 that is preferably integral with and axially aligned with a projecting, intermediate tubular coupling 18 providing a sound chamber 30 (FIG. 2) that terminates at the coupling outer lip 31. Preferably, an encircling groove 17 (FIG. 1) provides a reduced diameter boundary between the mouthpiece 16 and the coupling 18. A lanyard or strap may be conveniently attached to groove 17 for convenient carrying of the call 10. Horn 12 is threadably mated to intermediate coupling 18. As best viewed in FIG. 1, the tubular horn 12 having an end 13 proximate an open output passageway 15 through which sounds are transmitted in response to air blown into the mouthpiece 16 by the user.

Referring primarily to FIGS. 2 and 3, the horn 12 comprises an external tubular segment 20 that is integral with a reduced diameter, sealing section 22 that axially leads to an integral, threaded shank 23. Preferably, shank 23 has multiple, 0.500 pitch. Acme threads 28 that are threadably mated in assembly to the internal Acme threads 29 within coupling 18. In assembly, shank 23 passes through sound chamber 30 (FIG. 2) within coupling 18, and mates with the Acme threads 29 coaxially therewithin. The horn sealing section 22 comprises multiple, spaced-apart O-rings 26 received within suitable grooves formed in sealing region 22 (FIG. 2) that includes multiple, coaxial spaced apart O-rings 26 that make sealing contact within coupling 18. There is a smooth, internal, tubular sealing region 34 within coupling 18 that, in assembly, coaxially receives the horn sealing region 22 forms a seal with one or more of the O-rings 26.

Shank 23 has a receptive bore 33 (FIG. 3) for holding reeds. Bore 33 is in fluid flow communication through horn 12 and mouthpiece 16. A reed assembly, generally designated by the reference numeral 35, is seated within bore 33. Horn output passageway 15 (FIG. 5) is in fluid flow communication with bore 33 through a neighboring passageway 19 inside sealing region 22, a conical passageway 24 inside the threaded shank 23, and a small cylindrical passageway 27 inside shank 23 that abuts bore 33. Internal horn passageways 19, 24, and 27 (FIG. 5) establish fluid flow communication between bore 33 and horn passageway 15.

Figure 6:
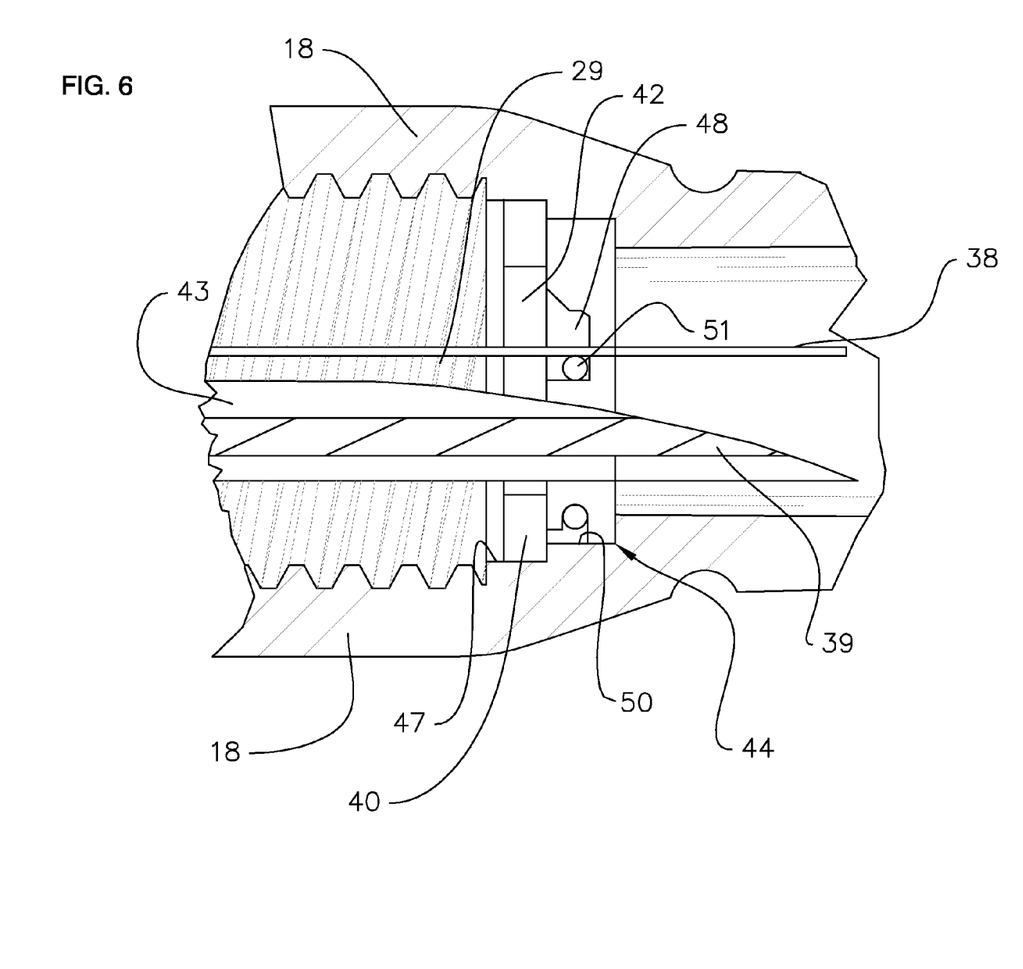
FIG. 6 is an enlarged fragmentary sectional view derived from circled region 6 in FIG. 5; and, FIG. 7 is an enlarged, isometric view of the contactor showing the through orifices and the contactor O-ring.
Figure 7:
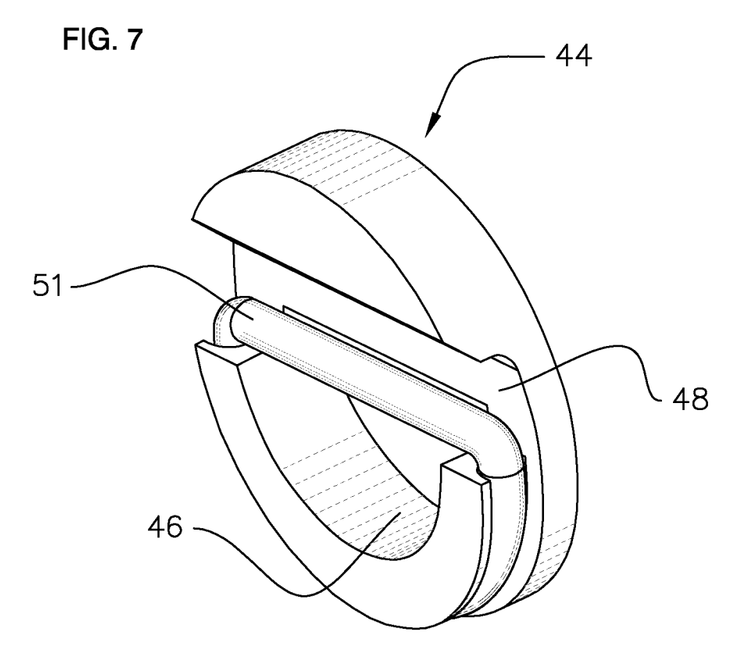

As best seen in FIGS. 2 and 3, the reed assembly 35 comprises a cylindrical anchor 37 to which an elongated, flat reed 38 and an opposing, elongated sounding board 39 are mounted. Anchor 37 has a transverse, split channel 41 (FIG. 2) enabling a pinching effect when the anchor is inserted within bore 33 for retention of the reed. Fluid flow communication through the neighboring bores is established as well. Reed 38 projects axially away from the anchor 37, remaining parallel with the neighboring sounding board 39, which is of a somewhat split, tubular configuration. Sounding board 39 has an internal, hollowed passageway 43 (FIG. 6) of generally semi-cylindrical proportions, the sounding board being generally in the form of a longitudinally split tube. Both the reed 38 and the sounding board 39 enter the intermediate coupling 18 associated with the handle 14. A lock washer 40 (FIGS. 2, 3) is anchored within coupling 18, being seated within a circular recess 47 (FIG. 6). Washer 40 has a circular orifice 42 penetrated by the reed 38 and sounding board 39. A washer-like reed contactor 44 best seen in FIG. 7, is coaxially positioned near washer 40. Contactor 44 (FIGS. 2, 6) has a semi-circular through-orifice 46 (FIGS. 2, 3, 7) proximate a transverse, indented channel 48 (FIGS. 2, 7). Reed 38 and sounding board 39 penetrate contactor orifice 46. Contactor 44 is received and press fitted into a circular recess 50 (FIG. 6) having a diameter slightly smaller than the coaxially neighboring recess 47 which seats washer 40. An O-ring 51 (FIGS. 3, 6) is fitted to the contactor 44 to resiliently make physical contact with the reed 38 to vary its effective resonating length. The O-ring 51 (FIG. 7) is fitted around the bottom periphery of the contactor 44, and across and through the transverse slot 48, so that it contacts reed 38 (FIG. 6).

Figure 4:
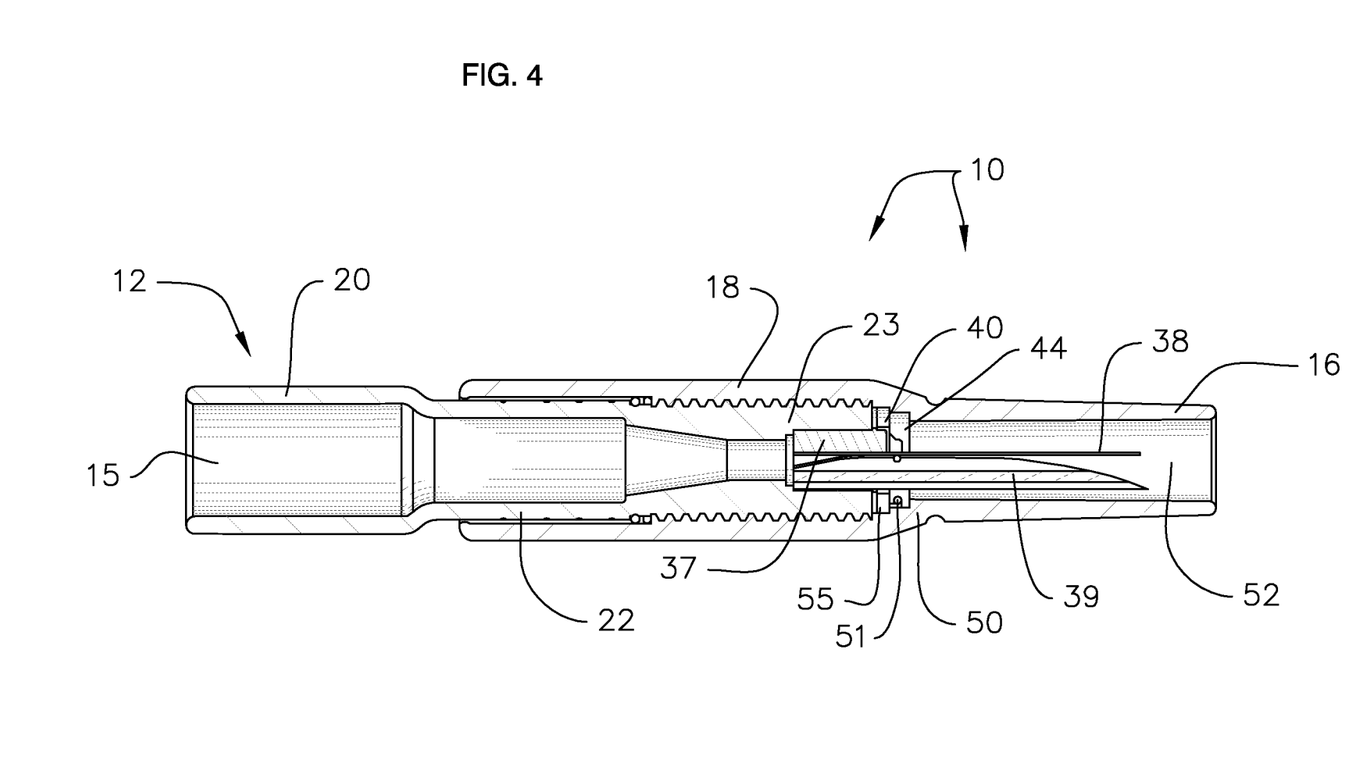
FIG. 4 is a longitudinal sectional view showing the game call configured in its minimum length.

In FIG. 4, the horn 12 is screwed all the way into the handle 14 (i.e., the intermediate coupling 18). By relative twisting between the horn and the mouthpiece the length of the call is changed. It can be seen in FIG. 6 that the reed 38 is physically touched by the contactor 44 (i.e., the O-ring 51) near the connection with reed anchor 37. Most of the physical reed structure is thus projecting within mouthpiece 16.

Figure 5:
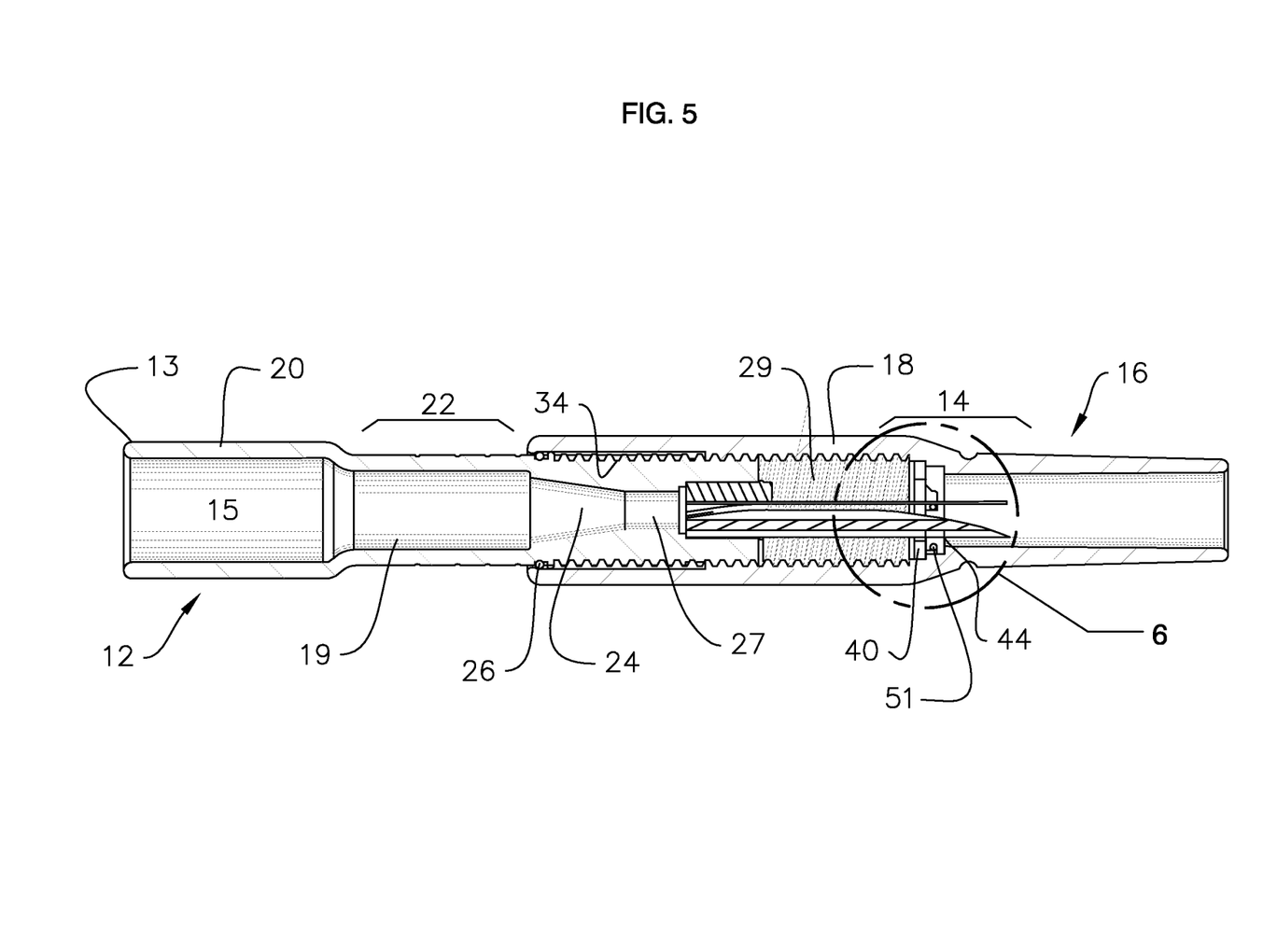
FIG. 5 is a longitudinal sectional view showing the game call configured in its maximum length.

FIGS. 5 and 6 show the horn 12 is unscrewed from the coupling 18. A seal within coupling 18 is still preserved by O-rings on sealing section 22, presenting at least one O-ring 26 to the interior of intermediate coupling 18. Here very little of the reed structure extending away from contactor 44 projects into the mouthpiece interior, producing higher pitched sounds. It will be apparent that when the horn 12 is screwed or unscrewed from the handle 14, the internal reed 38 and sounding board 39 move with it, so the point at which the reed 38 is touched by the contactor 44 anchored within the handle 14 is varied. In other words, twisting of the game call 10 varies the point along the reed 38 at which contact is made with contactor 44 and its O-ring 51. Further, the washer 40 and contactor 44 are locked in place within the handle 14, so they do not move relative to the mouthpiece 16. However, relative axial movements between the horn 12 and the coupling 18 caused by relative twisting of the mouthpiece/handle and horn 112 produce different contact points upon the reed structure effectuated by contactor 44 to thus vary effective reed dimensions, in turn modifying the sounds produced by the call.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. An adjustable mouth operated game call, comprising:
a generally tubular barrel having an internal passageway;
a generally tubular handle mounted to the barrel, the barrel and handle being rotatable relative to each other by a user;
a mouthpiece end to receive blown air from a user;
a flat reed having a first surface and a second surface opposite the first surface, the reed being positioned in the internal passageway;
a sounding board positioned in the internal passageway and extending parallel along and positioned adjacent to a first surface of the reed;
a contactor arranged to contact the second surface of the reed at a longitudinal contact point, the contact point being movable along the second surface of the reed at various locations on the second surface;
wherein relative axial twisting between the barrel and the handle varies the longitudinal contact point to change the effective reed length thereby varying output sounds produced by the call.

2. The game call of claim 1, wherein rotating the handle relative to the barrel adjusts a position of the reed relative to the handle.

3. The game call of claim 1, wherein the contactor maintains a fixed axial position relative to the handle.

4. The game call of claim 1, wherein the handle and the reed are threadably connected to each other.

5. An adjustable mouth operated game call, comprising:
a generally externally displaceable tubular barrel comprising a mouthpiece operatively coupled to an output passageway;
an externally displaceable handle mounted to the barrel and rotatable relative to the barrel;
at least one reed positioned in the output passageway, the reed producing sounds in response to air blown into the mouthpiece by the user;
at least one contactor positioned in the output passageway and arranged to contact the at least one reed at a contact point, the at least one contactor being movable along a length of the at least one reed upon twisting of the handle relative to the barrel to move the contact point longitudinally on the reed and vary output sounds from the call.

6. The game call of claim 5, further comprising a mouthpiece.

7. The game call of claim 6, wherein the barrel comprises at least one internal passageway through which sounds are transmitted in response to air blown into the mouthpiece by a user.

8. The game call of claim 5, further comprising a sounding board positioned adjacent to the at least one reed.

9. The game call of claim 8, wherein the sounding board extends parallel with the at least one reed.

10. The game call of claim 5, wherein rotating the handle relative to the barrel adjusts a position of the at least one reed relative to the handle.

11. The game call of claim 5, wherein the at least one contactor maintains a fixed axial position relative to the handle.

12. An adjustable mouth operated game call, comprising:
an elongated, hollow, generally tubular barrel;
a generally tubular handle carried by the barrel, the handle being axially aligned with and axially movable by twisting relative to the barrel;
a sound producing reed positioned within and axially displaceable along the call;
a contactor positioned within the call and arranged in contact with the reed;
wherein relative rotation between the barrel and the handle varies a longitudinal point at which the contactor touches the reed to vary output sounds from the call.

13. The game call of claim 12, further comprising a mouthpiece.

14. The game call of claim 13, wherein the barrel comprises at least one internal passageway through which sounds are transmitted in response to air blown into the mouthpiece by a user.

15. The game call of claim 12, further comprising a sounding board positioned adjacent to the at least one reed.

16. The game call of claim 15, wherein the sounding board extends parallel with the at least one reed.

17. The game call of claim 12, wherein rotating the handle relative to the barrel adjusts a position of the reed relative to the handle.

18. The game call of claim 12, wherein the contactor maintains a fixed axial position relative to the handle.

* * * * *